United States Patent
Stanciu et al.

(10) Patent No.: US 10,951,482 B2
(45) Date of Patent: Mar. 16, 2021

(54) DEVICE IDENTIFICATION ON A BUILDING AUTOMATION CONTROL NETWORK

(71) Applicant: MICROSOFT TECHNOLOGY LICENSING, LLC, Redmond, WA (US)

(72) Inventors: Alina Mihaela Stanciu, Redmond, WA (US); Mohamed Haitham Shami, Redmond, WA (US); Chris Neil Segura, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/981,695

(22) Filed: May 16, 2018

(65) Prior Publication Data

US 2019/0356550 A1 Nov. 21, 2019

(51) Int. Cl.
*H04L 12/28* (2006.01)
*H04L 12/24* (2006.01)
*G05B 15/02* (2006.01)
*H04L 29/08* (2006.01)

(52) U.S. Cl.
CPC .......... *H04L 41/12* (2013.01); *H04L 41/0866* (2013.01); *G05B 15/02* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 5,394,035 | A | 2/1995 | Elwell |
| 5,877,766 | A | 3/1999 | Bates et al. |
| 6,023,699 | A | 2/2000 | Knoblock et al. |
| 6,067,093 | A | 5/2000 | Grau et al. |
| 6,298,425 | B1 | 10/2001 | Whitaker et al. |
| 6,732,124 | B1 | 5/2004 | Koseki et al. |
| 7,512,450 | B2 | 3/2009 | Ahmed |
| 7,617,358 | B1 | 11/2009 | Liikanen et al. |

(Continued)

FOREIGN PATENT DOCUMENTS

| | | |
|---|---|---|
| WO | 2011159842 A2 | 12/2011 |
| WO | 2015160346 A1 | 10/2015 |

(Continued)

OTHER PUBLICATIONS

"Final Office Action Issued in U.S. Appl. No. 15/964,751", dated Feb. 4, 2019, 14 Pages.

(Continued)

*Primary Examiner* — Phirin Sam
(74) *Attorney, Agent, or Firm* — Holzer Patel Drennan

(57) ABSTRACT

Discovering devices and device configurations. A method includes sending a request to a device to obtain a data value from the device. The method further includes, in response, receiving the data value from the device. The method further includes, based on the received data value, identifying one or more device identifications for the device. The method further includes, using the one or more identifications, sending commands for equipment potentially connected to the device. The method further includes, receiving one or more responses to the commands. The method further includes, based on the one or more responses, concretely identifying the device.

20 Claims, 7 Drawing Sheets

(56) References Cited

U.S. PATENT DOCUMENTS

| | | |
|---|---|---|
| 7,620,772 B1 | 11/2009 | Liikanen et al. |
| 7,653,847 B1 | 1/2010 | Liikanen et al. |
| 7,685,360 B1 | 3/2010 | Brunnett et al. |
| 7,752,491 B1 | 7/2010 | Liikanen et al. |
| 7,777,632 B2 | 8/2010 | Elwell |
| 7,840,353 B2 | 11/2010 | Ouksel et al. |
| 7,916,421 B1 | 3/2011 | Liikanen et al. |
| 8,635,465 B1 | 1/2014 | Juels et al. |
| 8,732,039 B1 | 5/2014 | Chen et al. |
| 8,743,198 B2 | 6/2014 | Padmanabh et al. |
| 8,797,159 B2 | 8/2014 | Kirkpatrick et al. |
| 8,868,375 B1 | 10/2014 | Christian |
| 9,020,987 B1 | 4/2015 | Nanda et al. |
| 9,361,139 B1 | 6/2016 | Baig |
| 9,361,306 B1 | 6/2016 | Pawar et al. |
| 9,542,396 B1 | 1/2017 | Pawar et al. |
| 9,551,594 B1 | 1/2017 | Stamatakis |
| 9,766,079 B1 | 9/2017 | Poel et al. |
| 9,818,448 B1 | 11/2017 | Sexton et al. |
| 9,852,388 B1 | 12/2017 | Swieter et al. |
| 9,853,827 B1 | 12/2017 | Goodnow et al. |
| 9,875,333 B1 | 1/2018 | Verma et al. |
| 9,882,782 B2 | 1/2018 | Finkler et al. |
| 9,921,726 B1 | 3/2018 | Sculley et al. |
| 9,955,318 B1 | 4/2018 | Scheper et al. |
| 10,027,551 B1 | 7/2018 | Rickards et al. |
| 10,181,139 B2 | 1/2019 | Glass et al. |
| 10,397,733 B2 | 8/2019 | Srinivasan et al. |
| 10,430,293 B1 | 10/2019 | Skowronski et al. |
| 10,437,791 B1 | 10/2019 | Bebchuk et al. |
| 10,484,829 B1 | 11/2019 | Viton et al. |
| 10,691,354 B1 | 6/2020 | Kucherov |
| 10,705,918 B1 | 7/2020 | Hu et al. |
| 2002/0071392 A1 | 6/2002 | Grover et al. |
| 2002/0199017 A1 | 12/2002 | Russell |
| 2004/0003341 A1 | 1/2004 | Alsafadi et al. |
| 2004/0024724 A1 | 2/2004 | Rubin |
| 2004/0054726 A1 | 3/2004 | Doss et al. |
| 2004/0148397 A1 | 7/2004 | Aronoff et al. |
| 2004/0153334 A1 | 8/2004 | Dione |
| 2004/0193635 A1 | 9/2004 | Hsu et al. |
| 2004/0231002 A1 | 11/2004 | Jansen |
| 2004/0267694 A1 | 12/2004 | Sakai et al. |
| 2005/0154494 A1 | 7/2005 | Ahmed |
| 2005/0262081 A1 | 11/2005 | Newman |
| 2005/0278047 A1 | 12/2005 | Ahmed |
| 2006/0015376 A1 | 1/2006 | Sattler et al. |
| 2006/0202834 A1 | 9/2006 | Moriwaki |
| 2006/0248506 A1 | 11/2006 | Luo et al. |
| 2007/0043747 A1 | 2/2007 | Benton et al. |
| 2007/0100872 A1 | 5/2007 | Bodin et al. |
| 2007/0162315 A1 | 7/2007 | Hodges |
| 2007/0168347 A1 | 7/2007 | Childress et al. |
| 2007/0179934 A1 | 8/2007 | Basov et al. |
| 2007/0198708 A1 | 8/2007 | Moriwaki et al. |
| 2007/0282661 A1 | 12/2007 | Franco |
| 2007/0288291 A1 | 12/2007 | Earle |
| 2008/0046445 A1 | 2/2008 | Passey et al. |
| 2008/0183483 A1 | 7/2008 | Hart |
| 2008/0277486 A1 | 11/2008 | Seem et al. |
| 2009/0006143 A1 | 1/2009 | Orttung et al. |
| 2009/0055691 A1 | 2/2009 | Ouksel et al. |
| 2009/0063549 A1 | 3/2009 | Bhatia et al. |
| 2009/0077044 A1 | 3/2009 | Krishnaswamy et al. |
| 2009/0177484 A1 | 7/2009 | Davis et al. |
| 2010/0134655 A1 | 6/2010 | Kuroiwa |
| 2010/0228387 A1 | 9/2010 | Bowers et al. |
| 2010/0299517 A1 | 11/2010 | Jukic et al. |
| 2010/0318558 A1 | 12/2010 | Boothroyd |
| 2012/0066197 A1 | 3/2012 | Rana et al. |
| 2013/0223279 A1 | 8/2013 | Tinnakornsrisuphap et al. |
| 2013/0262060 A1 | 10/2013 | Higashi |
| 2014/0111520 A1 | 4/2014 | Cline et al. |
| 2014/0122428 A1 | 5/2014 | Zhou et al. |
| 2014/0136377 A1 | 5/2014 | Taylor |
| 2014/0219133 A1 | 8/2014 | Dasgupta et al. |
| 2014/0280363 A1 | 9/2014 | Heng et al. |
| 2014/0297206 A1* | 10/2014 | Silverman ............ G01R 22/063 702/58 |
| 2014/0309914 A1* | 10/2014 | Scofield ................ G08G 1/052 701/119 |
| 2014/0310476 A1 | 10/2014 | Kruus et al. |
| 2014/0351181 A1* | 11/2014 | Canoy .................... G06N 20/00 706/12 |
| 2014/0366105 A1 | 12/2014 | Bradley et al. |
| 2015/0032777 A1 | 1/2015 | Dietrich et al. |
| 2015/0193739 A1 | 7/2015 | Min et al. |
| 2015/0205582 A1 | 7/2015 | Iskander et al. |
| 2015/0278335 A1 | 10/2015 | Opitz et al. |
| 2015/0294488 A1 | 10/2015 | Iwasaki et al. |
| 2015/0381515 A1 | 12/2015 | Mattson et al. |
| 2016/0004759 A1 | 1/2016 | Ramakrishnan et al. |
| 2016/0012556 A1 | 1/2016 | Moore et al. |
| 2016/0071219 A1* | 3/2016 | Joshi ................ G06Q 30/0269 705/4 |
| 2016/0072676 A1 | 3/2016 | Gomadam et al. |
| 2016/0072891 A1* | 3/2016 | Joshi ................ G06Q 30/0269 370/254 |
| 2016/0103931 A1 | 4/2016 | Appavu |
| 2016/0110434 A1 | 4/2016 | Kakaraddi et al. |
| 2016/0135241 A1* | 5/2016 | Gujral ..................... H04W 4/70 370/328 |
| 2016/0147962 A1* | 5/2016 | Vollmar .................. G16H 50/20 705/2 |
| 2016/0285717 A1* | 9/2016 | Kim ..................... H04L 12/2803 |
| 2016/0291942 A1 | 10/2016 | Hutchison |
| 2016/0292351 A1 | 10/2016 | Jacques et al. |
| 2016/0314542 A1* | 10/2016 | Vollmar ............ G06Q 10/06311 |
| 2016/0357524 A1 | 12/2016 | Maluf et al. |
| 2017/0026806 A1 | 1/2017 | Jampani et al. |
| 2017/0083386 A1 | 3/2017 | Wing et al. |
| 2017/0126681 A1 | 5/2017 | Barrett et al. |
| 2017/0168472 A1* | 6/2017 | Ando .................... G05B 19/042 |
| 2017/0171313 A1* | 6/2017 | Britt ........................ H04W 4/21 |
| 2017/0235813 A1 | 8/2017 | Munro et al. |
| 2017/0242881 A1 | 8/2017 | Northfleet et al. |
| 2017/0244742 A1 | 8/2017 | Helmsen et al. |
| 2017/0247264 A1* | 8/2017 | Eddy ......................... B03B 9/02 |
| 2017/0285081 A1* | 10/2017 | Silverman ............ G01R 22/063 |
| 2017/0337226 A1 | 11/2017 | Bliss et al. |
| 2018/0018402 A1 | 1/2018 | Vogler et al. |
| 2018/0060256 A1 | 3/2018 | Walker et al. |
| 2018/0074852 A1 | 3/2018 | Bishop et al. |
| 2018/0096589 A1* | 4/2018 | Lynch ....................... G08B 1/08 |
| 2018/0098191 A1 | 4/2018 | Srinivasan et al. |
| 2018/0116004 A1* | 4/2018 | Britt ...................... H04W 40/125 |
| 2018/0137858 A1 | 5/2018 | Saxena et al. |
| 2018/0208448 A1* | 7/2018 | Zimmerman ........ B67D 1/0888 1/888 |
| 2018/0268029 A1 | 9/2018 | Clemson |
| 2018/0336396 A1 | 11/2018 | Harrison |
| 2019/0045119 A1 | 2/2019 | Stokking et al. |
| 2019/0130367 A1 | 5/2019 | Pell et al. |
| 2019/0182369 A1 | 6/2019 | Gauvin et al. |
| 2019/0186924 A1 | 6/2019 | Belt et al. |
| 2019/0289648 A1 | 9/2019 | Kim et al. |
| 2019/0306654 A1 | 10/2019 | Srinivasan et al. |
| 2019/0332437 A1 | 10/2019 | Van hoof et al. |
| 2019/0332693 A1 | 10/2019 | Vandenbrouck et al. |
| 2019/0332713 A1 | 10/2019 | Van Hoof et al. |
| 2019/0332789 A1 | 10/2019 | Vandenbrouck et al. |
| 2019/0335300 A1 | 10/2019 | Viton et al. |
| 2019/0339871 A1 | 11/2019 | Kucherov et al. |
| 2019/0339872 A1 | 11/2019 | Kucherov et al. |
| 2019/0347606 A1 | 11/2019 | Malecha et al. |
| 2019/0354906 A1 | 11/2019 | Stanciu et al. |
| 2019/0354910 A1 | 11/2019 | Escapa et al. |
| 2019/0356538 A1 | 11/2019 | Stanciu et al. |

(56) References Cited

U.S. PATENT DOCUMENTS

2020/0042639 A1 2/2020 Mathison et al.
2020/0162847 A1 5/2020 Viton et al.

FOREIGN PATENT DOCUMENTS

WO 2016054629 A1 4/2016
WO 2016200656 A1 12/2016

OTHER PUBLICATIONS

"Non Final Office Action Issued in U.S. Appl. No. 15/964,751", dated Aug. 29, 2018, 15 Pages.
"International Search Report and Written Opinion Issued in PCT Application No. PCT/US19/030798", dated Jul. 26, 2019, 12 Pages.
"International Search Report and Written Opinion Issued in PCT Application No. PCT/US19/030796", dated Jul. 26, 2019, 10 Pages.
"International Search Report & Written Opinion Issued in PCT Application No. PCT/US2019/030797", dated Jul. 8, 2019, 13 Pages.
"International Search Report and Written Opinion Issued in PCT Patent Application No. PCT/US2019/030779", dated Jul. 10, 2019, 12 Pages.
"INT (x86 instruction)", https://en.wikipedia.org/w/index.php?title=INT_(x86_instruction)&oldid=809423342, Nov. 9, 2017, 2 pages.
"Notice of Allowance Issued in U.S. Appl. No. 15/964,751", dated Jul. 31, 2019, 6 Pages.
"Non Final Office Action Issued in U.S. Appl. No. 15/964,736", dated Jun. 27, 2019, 12 Pages.
"International Search Report and Written Opinion Issued in Patent Application No. PCT/US2019/026420", dated May 31, 2019, 11 Pages.
"Final Office Action Issued in U.S. Appl. No. 15/964,736", dated Nov. 29, 2019, 12 Pages.
"Non Final Office Action Issued in U.S. Appl. No. 15/964,754", dated Feb. 13, 2020, 15 Pages.
"Non Final Office Action Issued in U.S. Appl. No. 15/985,487", dated Mar. 25, 2020, 39 Pages.
"Non Final Office Action Issued in U.S. Appl. No. 15/985,513", dated Mar. 18, 2020, 28 Pages.
"Non Final Office Action Issued in U.S. Appl. No. 16/685,975", dated Mar. 17, 2020, 16 Pages.
"Non Final Office Action Issued in U.S. Appl. No. 15/985,228", dated May 12, 2020, 20 Pages.
"Final Office Action Issued in U.S. Appl. No. 15/985,513", dated Jun. 5, 2020, 25 Pages.
"Non Final Office Action Issued in U.S. Appl. No. 15/964,626", dated Jul. 24, 2020, 15 Pages.
"Non Final Office Action Issued in U.S. Appl. No. 15/964,623", dated Jul. 24, 2020, 15 Pages.
"Tag (Metadata)", Retrieved From: https://web.archive.org/web/20180128020737/https://en.wikipedia.org/wiki/TAG, Apr. 17, 2018, 10 Pages.
"Final Office Action Issued in U.S. Appl. No. 15/985,487", dated Aug. 26, 2020, 59 Pages.
"Final Office Action Issued in U.S. Appl. No. 15/985,228", dated Oct. 6, 2020, 21 Pages.
"Final Office Action Issued in U.S. Appl. No. 15/964,623", dated Jan. 15, 2021, 17 Pages.
"Final Office Action Issued in U.S. Appl. No. 15/964,626", dated Jan. 21, 2021, 17 Pages.

* cited by examiner

DEVICE IDENTIFICATION ON A BUILDING AUTOMATION CONTROL NETWORK

BACKGROUND

Background and Relevant Art

Computers and computing systems have affected nearly every aspect of modern living. Computers are generally involved in work, recreation, healthcare, transportation, entertainment, household management, etc. A computing system can be manifested through a variety of form factors such as computers, laptops, smartphones, gateways, controllers, IoT devices and sensors.

Further, computing system functionality can be enhanced by a computing systems' ability to be interconnected to other computing systems via network connections. Network connections may include, but are not limited to, connections via wired or wireless Ethernet, wireless mesh networks, cellular connections, or even computer to computer connections through serial, parallel, USB, or other connections via a wide variety of protocols (such as, but not limited to, MQTT, AMQP, http, Bluetooth, OPC-UA, SCADA, CoAP, BACnet, Modbus, KNX, LonTalk, Zigbee, Zwave, Sigfox, LoRa, etc.), some of which are industry or domain specific. The connections allow a computing system to access services at other computing systems and to quickly and efficiently receive data from other computing systems.

As computing systems have become cheaper and smaller, they have begun to proliferate to almost all areas of life. For example, Internet of Things (IoT) devices are network-connected devices that are placed in many physical spaces to enable people to interact with and gather information about their environment. For example, offices or homes may include numerous IoT devices that can be used to control locks, to manage indoor climate and receive climate information, to manage lighting and receive lighting information, to open and close doors, to perform cleaning functions, to control audio and/or video equipment, to provide voice interaction, to provide security and monitoring capabilities, etc. As such, IoT devices can process and generate vast amounts of information. Notably, IoT devices are not limited to use in structures such as offices or homes. For example, IoT devices may be used to track any manner of physical items (including, for example, animals such as livestock or pets), to monitor health of people or animals, and so forth.

Interconnection of computing devices has resulted in the proliferation of IoT networks, including networks of automated control systems where networks of controllers are used to control various devices. The devices are typically connected to controls and sensors. The devices can receive data from the sensors such as environmental data such as temperature, $CO_2$ concentration, airflow, or any one of a number of different environmental conditions. Based on the detected environmental conditions, the devices include computer instructions that can be executed by processors which enable the devices to use the controls to control various pieces of equipment. For example, the controls can be used to control blower motors, heaters, alarms, etc.

One can imagine that even a simple building may include multiple different controllers and/or devices. Each device needs to be properly configured and documented. However, for a number of different reasons, configuration and documentation of devices is often incomplete and/or incorrect. For example, consider the case when multiple contractors are working together to implement building control systems. Different contractors may have different conventions for configuring and/or documenting devices. Thus, for example naming conventions across different devices may be different depending on the contractor that installed the device. In another example, consider the case where a device fails and is replaced with a new device without properly updating the information on the device and/or information documenting devices. Consider yet another example where the device is simply incorrectly configured and/or incorrectly documented in device documentation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a device control environment. The method includes acts for discovering devices and device configurations. The method includes sending a request to a device to obtain a data value from the device. The method further includes, in response, receiving the data value from the device. The method further includes, based on the received data value, identifying one or more device identifications for the device. The method further includes, using the one or more identifications, sending commands for equipment potentially connected to the device. The method further includes, receiving one or more responses to the commands. The method further includes, based on the one or more responses, concretely identifying the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
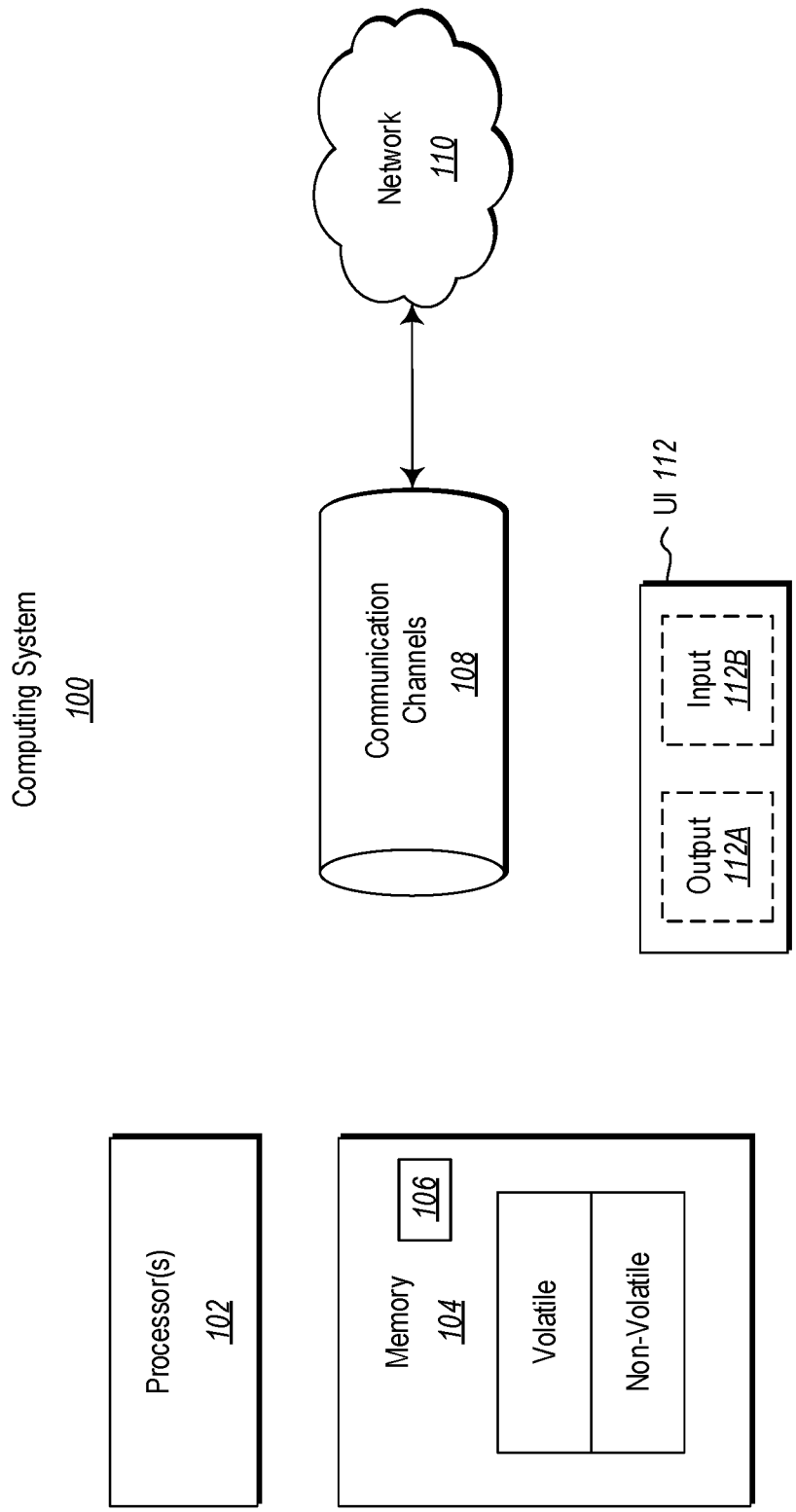
FIG. 1 illustrates an example computer architecture that facilitates operation of the principles described herein.

Embodiments illustrated herein are directed to managing devices in a device network. In particular, a device network deployed to a building, group of buildings, or other location may include devices that are not documented and/or misconfigured. Embodiments illustrated herein can probe the device network to attempt to identify devices on the network. Identifying devices on the network can include identifying the existence of the devices and/or the configuration of the devices. Once the identification and configuration of the devices is identified, a data store managing the devices can be updated to accurately reflect the current state of the device network.

In general, a management entity can probe devices on the device network using a building automation protocols that includes such probing functionality. The management entity, for example, can attempt to read data from connection points connected to sensors to attempt to identify what types of sensors are connected to the device. For example, if the management entity is able to detect that the device is connected to temperature sensors, then the management entity can surmise that the device is a type of device from one of a limited number of devices. The management entity can then attempt to control equipment connected to the device based on the types of devices to which the device could belong. For example, the management entity may attempt to actuate a heater on the device. If the management entity receives a response that the management entity was able to actuate a heater, then the management entity can identify that the device is likely a temperature control device. In some embodiments, by sending specific commands that are specific to a particular device, embodiments may be able to precisely identify the device, and/or a precise configuration of the device. This allows the management entity to update information about the device network, and in particular for the probed device, in a data store. This can be performed iteratively with known and unknown devices on the network. When this is performed with known devices, this can be performed to attempt to ensure that the configuration documented in the data store matches the actual configuration of the device to resolve any mismatched configurations.

Some introductory discussion of a computing system will be described with respect to FIG. 1. Then providing access to sensor data from devices within a physical space, consistent with the multi-database environment introduced above, will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes NAND flash memory or other flash memory, RAM, DRAM, SRAM, ROM, EEPROM, CD-ROM or other optical disk storage, solid-state disk storage, magnetic disk storage or other storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, traditional computing systems such as smartphones, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, etc.) and the like. In modern computing systems, in the age of Internet of Things (IoT), computing system configurations may be virtually any type of device including (but most certainly not limited to) smart luggage, smart clothing, smart jewelry, smart drinking bottles, smart skate boards, smart golf clubs, smart toys, smart brewing machines, smart wallets, smart home and business automation gear, smart appliances, smart furniture, etc. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Reference is made frequently herein to IoT devices. As used herein, an IoT device can include any device that is connected to a network (whether that be a personal area network, local area network, wide area network, and/or the Internet) and that interacts with a physical environment (whether that be to control or influence some aspect of a physical environment, and/or to receive sensor data from a physical environment). As such, references to IoT devices herein should be interpreted broadly to include vast categories of devices, regardless of how those devices may be named or marketed. From a computing perspective, IoT devices may range from fairly complex (e.g., such as being embodied on a general-purpose computer system), to fairly simple (e.g., such as being embodied within a special-purpose microcontroller environment).

Figure 2:
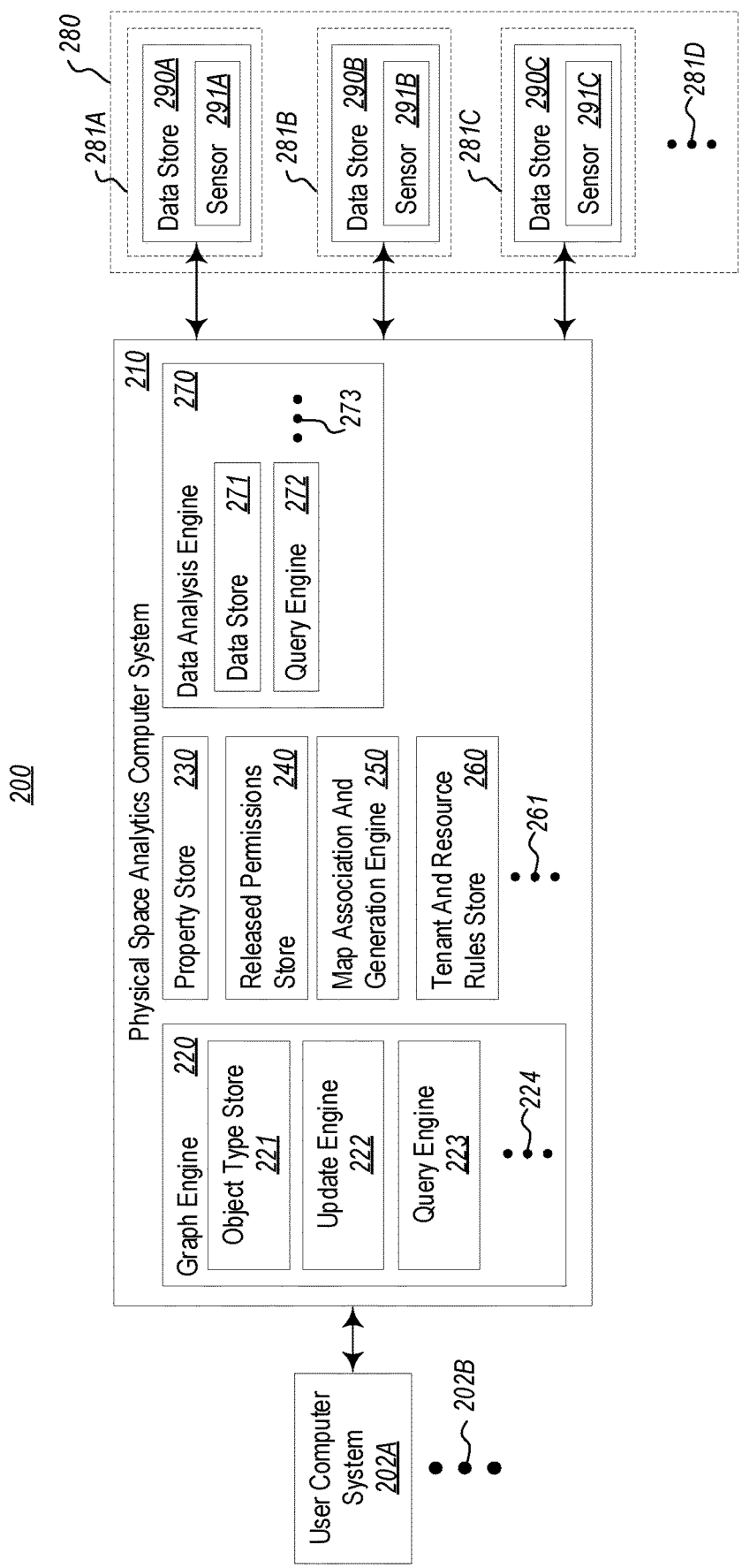
FIG. 2 illustrates an example environment for providing access to sensor data from devices within a physical space.

FIG. 2 illustrates an example environment 200 for providing access to sensor data from devices within a physical space. As illustrated, the environment 200 includes a user computer system 202A. The user computer system 202A may be embodied, for example, by computer system 100, as described with respect to FIG. 1. The user computer system 202A may comprise any type of computer system that is configured to communicate with, and utilize the functionality of, a server computer system 210, which is described later. In an example, the user computer system 202A may comprise a desktop computer, a laptop computer, a tablet, a smartphone, and so forth. Notably, while the environment 200 includes a single user computer system 202A, the ellipses 202B represents that any number of user computer systems may communicate with, and utilize the functionality of, the server computer system 210.

The server computer system 210 is configured to provide access to sensor data from devices (such as IoT devices) located within physical spaces (e.g., a room within a building), as further described herein. Again, the server computer system 210 may be embodied, for example, by computer system 100, as described with respect to FIG. 1. The server computer system 210 may comprise any type of computer system, including any combination of hardware and/or software that is configured to provide access to sensor data from devices located within particular physical spaces.

As shown, the server computer system 210 may include various engines, functional blocks, and components, including (as examples) a graph engine 220, a property store 230, a rules and permissions store 240, an association and generation engine 250, a tenant and resource rules store 260, and a data analysis engine 270, each of which may also include additional engines, functional blocks, and components (e.g., an object type store 221 within the graph engine 220). The various engines, components, and/or functional blocks of the server computer system 210 may be implemented on a single computer system, or may be implemented as a distributed computer system that includes elements resident in a cloud environment, and/or that implement aspects of cloud computing (i.e., at least one of the various illustrated engines may be implemented locally, while at least one other engine may be implemented remotely). In addition, the various engines, functional blocks, and/or components of the server computer system 210 may be implemented as software, hardware, or a combination of software and hardware.

Notably, the configuration of the server computer system 210 illustrated in FIG. 2 is shown only for exemplary purposes. As such, the server computer system 210 may include more or less than the engines, functional blocks, and/or components illustrated in FIG. 2. In particular, the ellipses 261 represent that any number of engines, functional blocks, and/or components may be utilized within the server computer system. Although not illustrated, the various engines of the server computer system 210 may access and/or utilize a processor and memory, such as the processor 102 and the memory 104 of FIG. 1, as needed, to perform their various functions.

Figure 3:
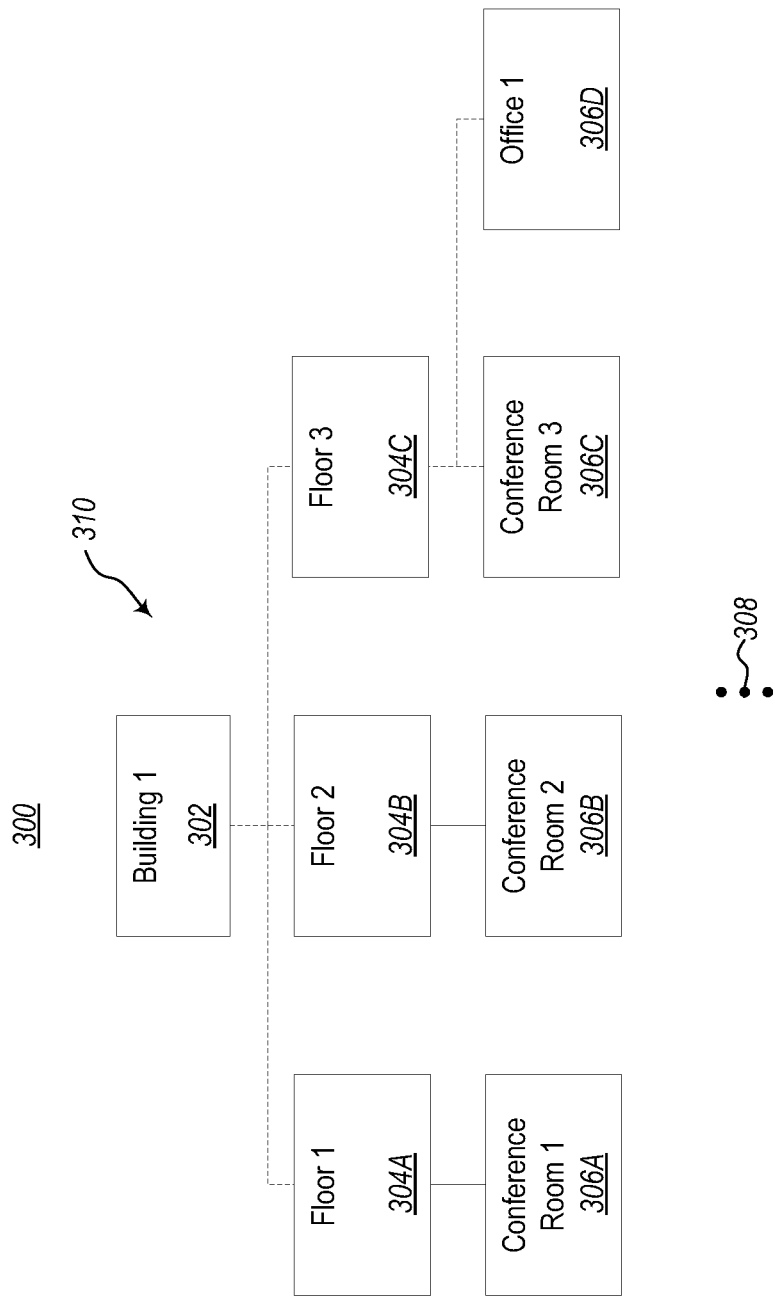
FIG. 3 illustrates an example hierarchical graph associated with a physical space.

As briefly introduced, the server computer system 210 includes the graph engine 220, the property store 230, the rules and permissions store 240, the association and generation engine 250, the tenant and resource rules store 260, and the data analysis engine 270. The graph engine 220 may be configured to generate, store, and/or manage one or more hierarchical graphs (e.g., hierarchical graph 310 of FIG. 3) that defines a topology of areas and sub-areas of a physical space. For instance, FIG. 3 illustrates a hierarchical graph 310 that includes a topology of nodes associated with a physical space comprising "building 1" (e.g., building node 302). The hierarchical graph 310 also represents areas and sub-areas of "building 1," such as different floors (i.e., floor node 304A, floor node 304B, and floor node 304C, all of which are sub-nodes of building node 302), as well as different rooms (i.e., conference room node 306A, conference room node 306B, conference room node 306C, and office node 306D) associated with each floor. Although not shown, each of the room nodes 306A-306A could be associated with additional sub-nodes representing objects in, or associated with, the rooms, such as desks, chairs, tables, computer, lab equipment, services to control the room, services to reserve the room, etc.

Figure 4:
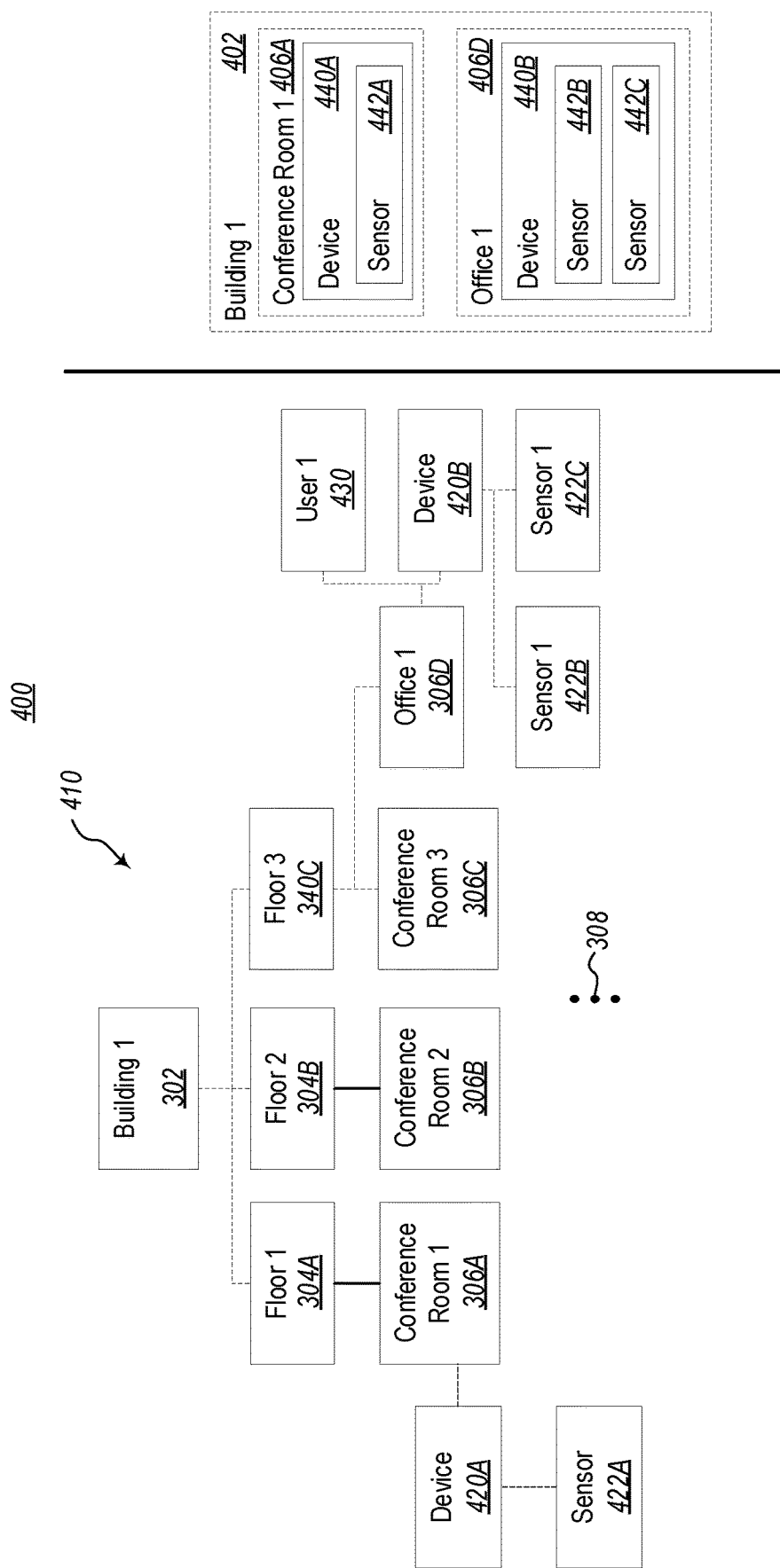
FIG. 4 illustrates an example an example hierarchical graph associated with a physical space and devices associated with areas or sub-areas of the physical space.

Any node in the hierarchical graph 310 could be associated with devices/sensors. For example, the various room nodes (i.e., the conference room node 306A and the office node 306D) may also be associated with devices and sensors. Similarly, FIG. 4 shows a related graph 410, that includes device nodes 420A and 420B and sensor nodes 422A-422C. While only seven nodes associated with areas/sub-areas are illustrated in FIG. 3, the ellipses 308 represents that any number of nodes that are associated with areas/sub-areas and devices/sensors may be utilized when practicing the principles described herein (whether those nodes be added or deleted in a horizontal direction (breadth) or a vertical direction (depth)). Furthermore, the topology of the graph may be continuously modified via adding or deleting nodes of the graph (in a horizontal direction or vertical direction). For instance, using the example of FIG. 3, a number of additional building nodes associated with different buildings than building 1 (corresponding to building node 302), each of which additional buildings may include additional nodes corresponding to floors, rooms, and so forth, may also be included within the graph 310.

In some embodiments, the hierarchical graph 310 may be stored within a relational database, though any type of database could be used. Additionally, regardless of the type of graph used, the full paths in the graph for each given node may be stored as metadata in the node to increase the performance and efficiency of querying the hierarchical graph 310. In this way, identification (e.g., via a query) of any ancestral node or child node (i.e., children nodes, grandchildren nodes, great-grandchildren nodes, and so on) of a given node may be performed in an order of one operation (i.e., an O(1) operation). For instance, a query that requests each node having a path that starts with "building1/floor3" (i.e., corresponding to the floor node 304C) may identify conference room 3 and office 1 (i.e., corresponding to conference room node 306C and office node 306D, respectively) as being children of the floor node 304C in an O(1) operation.

Notably, even if the conference room node 306C and the office node 306D were grandchildren, great-grandchildren, and so on, of the floor node 304C, a request for identification of each node having a path that starts with "building1/floor3" could result in identification of the conference room node 306C and the office node 306D (as well as any nodes between the floor node 304C and the conference room node 306C/the office node 306D) in an O(1) operation. Accordingly, paths associated with each node may be automatically computed and stored, which effectively tracks a primary identification for each node of the graph. While a cost is incurred upfront to generate and store each path (e.g., in connection with the addition and/or removal of one or more nodes to within the graph), the graph may be quickly and efficiently traversed to identify nodes and relationships between nodes within the graph than traditional traversing of graphs. By storing primarily static information in the graph, however, the need to generate/store these paths can be relatively infrequent.

Returning to FIG. 2, as illustrated, the graph engine 220 includes various components that may comprise any combination of appropriate hardware and/or software, including an object type store 221, an update engine 222, and a query engine 223. Notably, the ellipses 224 represents that any number of components may be included with the graph engine 220 (i.e., more or less than the components illustrated within the graph engine 220).

The object type store 221 comprises a data store of node object types that can be selected to create additional nodes within the graph 310. For instance, in addition to the node object types of buildings, floors, and rooms that are explicitly shown in FIG. 3, any number of object types associated with areas/sub-areas of physical spaces (as well as devices/sensors and individuals, as further described herein) may be used within the graph 310, including but not limited to organizations (e.g., businesses), geographic regions (e.g., continents, countries, states, cities, counties, and so forth), types of areas (e.g., buildings, farms, houses, apartments, conference rooms, offices, bathrooms, breakrooms, study areas, desks, chairs, and so forth), types of devices (e.g., thermostat, projector, paper towel dispenser, television, computer, and so forth), types of sensors (e.g., thermocouple, thermistor, humidity sensor, CO2 sensor, Geiger counter), and so forth. Additionally, the object type store 221 may be extensible, such that additional object types may be created on demand.

The update engine 222 may be configured to update the hierarchical graph 310 with any changes made to the graph. For instance, the update engine 222 may update the graph with additional nodes, update the graph with less nodes (e.g., deleted nodes), update nodes with new or modified properties, update nodes with new or modified paths, and perform any other operations associated with modifying or updating the graph.

The query engine 223 may be configured to allow for performing queries to the hierarchical graph 310. In particular, the query engine 223 may be configured to receive queries, generate query plans, build responses to queries, and/or perform any other operations associated with receiving and responding to queries of the hierarchical graph 310.

As briefly introduced, the server computer system 210 further includes data analysis engine 270. The data analysis engine 270 may be configured to receive, gather, manage, and process data received from devices/sensors located within a physical space (associated with the hierarchical graph that defines the topology of the physical space). For instance, FIG. 2 illustrates various devices and sensors located within a physical space 280. In particular, the physical space 280 comprises various areas and sub-areas, including area/sub-area 281A, area/sub-area 281B, and area/sub-area 281C. Each of the sub-areas includes a single device having a single sensor (i.e., area/sub-area 281A includes device 290A having sensor 291A, area/sub-area 281B includes device 290B having sensor 291B, and area/sub-area 281C includes device 290C having sensor 291C). Notably, while each of the areas/sub-areas within the physical space 280 includes a single device having a single sensor, the ellipses 290 represents that there may be any number of areas/sub-areas within the physical space 280, each of the areas/sub-areas including any number of devices having any number of sensors (including zero devices/sensors).

Notably, the devices and sensors may include any type of devices/sensors, including but not limited to devices/sensors associated with detecting temperature, $CO_2$, light, pressure, toxic chemicals, humidity, and so forth. As such, the combination of the devices 290 (i.e., the device 290A through the device 290C) and the sensors 291 (i.e., the sensor 291A through the sensor 291C) may be configured to capture sensor data (e.g., changes in temperature) and send the captured data to the data analysis engine 270. Furthermore, "sensors" can be partially or entirely virtual. A sensor, as used herein, does not have to be a physical device, but rather a "sensor" output could be a value provided by another cloud service or API. For example, a "sensor" could output the current weather forecast for a building's location from NOAA.

The data analysis engine 270 may then be configured to receive, gather, manage, and process data received from such devices/sensors. In particular, as illustrated, the data analysis may include a data store 271 that is configured to organize, store, and allow access to received sensor data. The data store 271 may comprise any type of data store that is configured to manage dynamic, frequently changing data such as sensor data, and that provides quick and efficient performance. In an example, the data store 271 may comprise a key-value database. For instance, the data store 271 may comprise a distributed, in-memory key-value store. Data associated with a particular device (e.g., sensor data) may also be linked with device nodes of the hierarchical graph (e.g., the hierarchical graph 410), such that upon identification of a device node within the hierarchical graph, sensor data associated with the device corresponding to the device node may also be accessed, as further described herein.

As shown, the data analysis engine 270 further includes a query engine 272. The query engine 272 may be configured to allow for performing queries to the data store 271. In particular, the query engine 272 may be configured to receive queries, generate query plans, build responses to queries, and/or perform any other operations associated with receiving and responding to queries of the data store 271.

FIG. 4 illustrates an environment 400 including hierarchical graph 410 comprising area/sub-area nodes, as well as device/sensor nodes that are each associated with one or more area/sub-area nodes. As shown, the conference room node 306A is associated with device node 420A (having a corresponding sensor node 422A) and the office node 306D is associated with the device node 420B (having two corresponding sensor nodes, the sensor node 422B and the sensor node 422C). Additionally, FIG. 4 includes a representation of an actual physical space 402 (associated with building 1) that corresponds to the building node 302.

As illustrated, the physical space 402 also comprises conference room 406A (associated with conference room 1 and corresponding to the conference room node 306A) that includes the actual physical device 440A having the sensor 442A, as well as office 406D (associated with office 1 and corresponding to the office node 306D) that includes the actual physical device 440B having both the sensor 442B and the sensor 442C. In a specific example, the device 440A may correspond to a thermostat that includes a thermocouple (i.e., the sensor 442A) for measuring temperature. Such temperature measurements may then be sent to the data analysis engine for managing, storing, and processing the received sensor data.

Additionally, as illustrated in FIG. 4, user nodes (e.g., user node 430) may be included within the hierarchical graph 410 as being associated with one or more area/sub-area nodes. In particular, FIG. 4 shows the user node 430 being associated with the office node 306D. In a specific example, the user 1 (i.e., corresponding to the user node 330) may comprise an individual that has been assigned to office 1 (i.e., corresponding to the office node 306D).

Notably, regardless of object/node type (e.g., area/sub-area nodes, device nodes, sensor nodes, user nodes), data and/or metadata associated with the node may be stored in the hierarchical graph (e.g., the hierarchical graph 310 or the hierarchical graph 410), the data store 271 of the data analysis engine 270, or any other appropriate location associated with the server computer system 210.

As briefly introduced, the server computer system 210 further includes property store 230, rules and permissions store 240, association and generation engine 250, and tenant and resource store 260. The property store 230 may comprise a data store that includes properties associated with nodes of the hierarchical graph 310. For instance, particular properties may automatically be associated with particular object types (i.e., node types), as well as children of such object types. In a more particular example, a property associated with occupancy of a chair within a room may propagate to the room itself (i.e., showing that the room is occupied). Furthermore, as discussed with respect to the object type store 231, the property store may also be extensible, such that properties may be created and associated with any given node, and potentially associated with ancestral or children nodes of the given node.

The rules and permissions store 240 may include various rules and permissions associated with particular roles assigned to users. For instance, based on a particular role (e.g., an administrator) assigned to a user, the user may have access to perform various operations, including adding/deleting nodes, modifying nodes, accessing/modifying functionality of various devices (e.g., locking doors), and so forth.

The association and generation engine 250 may be configured to perform numerous functions with respect to associating maps with the hierarchical graph (and devices providing data to the data store), and/or generating the hierarchical graph, itself. For instance, the association and generation engine 250 may be able to generate the hierarchal graph 300 based on user input and/or based on a map. In another example, the association and generation engine 250 may be able to link nodes of the hierarchical graph to locations or devices included within a map. In yet another example, the association and generation engine 250 may further be able to generate a map based on information included within the hierarchical graph corresponding to nodes of the hierarchical graph.

The tenant and resource rules store 260 may include rules associated with how resources, permissions, properties, and so forth are to be handled for each given entity (e.g., tenant) that utilizes the hierarchical graph.

Notably, the ellipses 261 represent that the server computer system 210 may include any number of components (i.e., whether more or less) than the components illustrated within the server computer system in FIG. 2. For instance, while both the graph engine 220 and the data analysis engine 270 include corresponding query engines (i.e., the query engine 223 and the query engine 272, respectively), an overarching query engine may be included within the physical analytics computer system that allows for querying both the graph engine 220 and the data analysis engine 270. In this way, a user may be able to generate queries that can traverse the hierarchical graph (e.g., the hierarchical graph 410) to identify one or more devices associated with a particular area/sub-area of the hierarchical graph, as well as current (or previous) sensor data associated with the one or more devices via the data store 271 and the data analysis engine 270.

Figure 5:
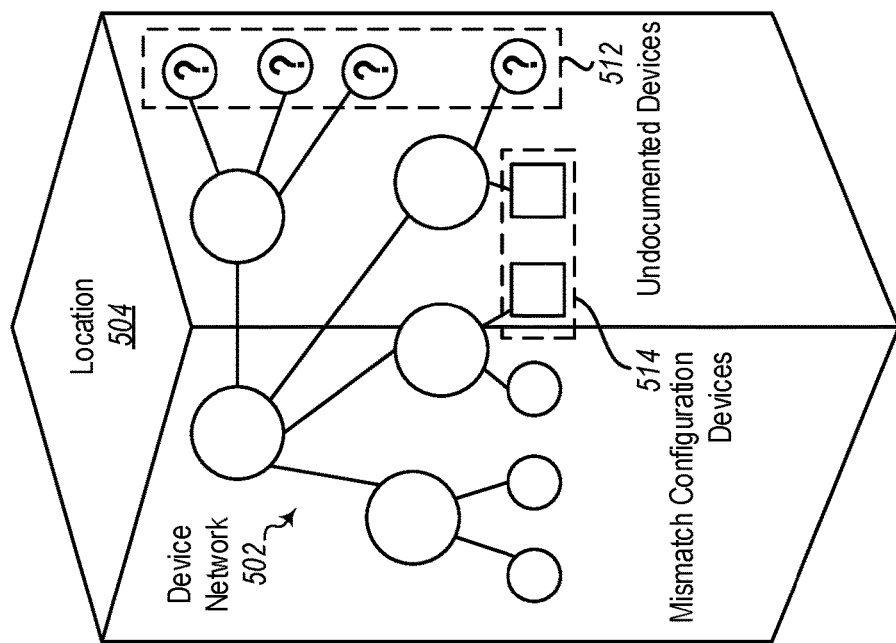
FIG. 5 illustrates an example device network.
Figure 5:
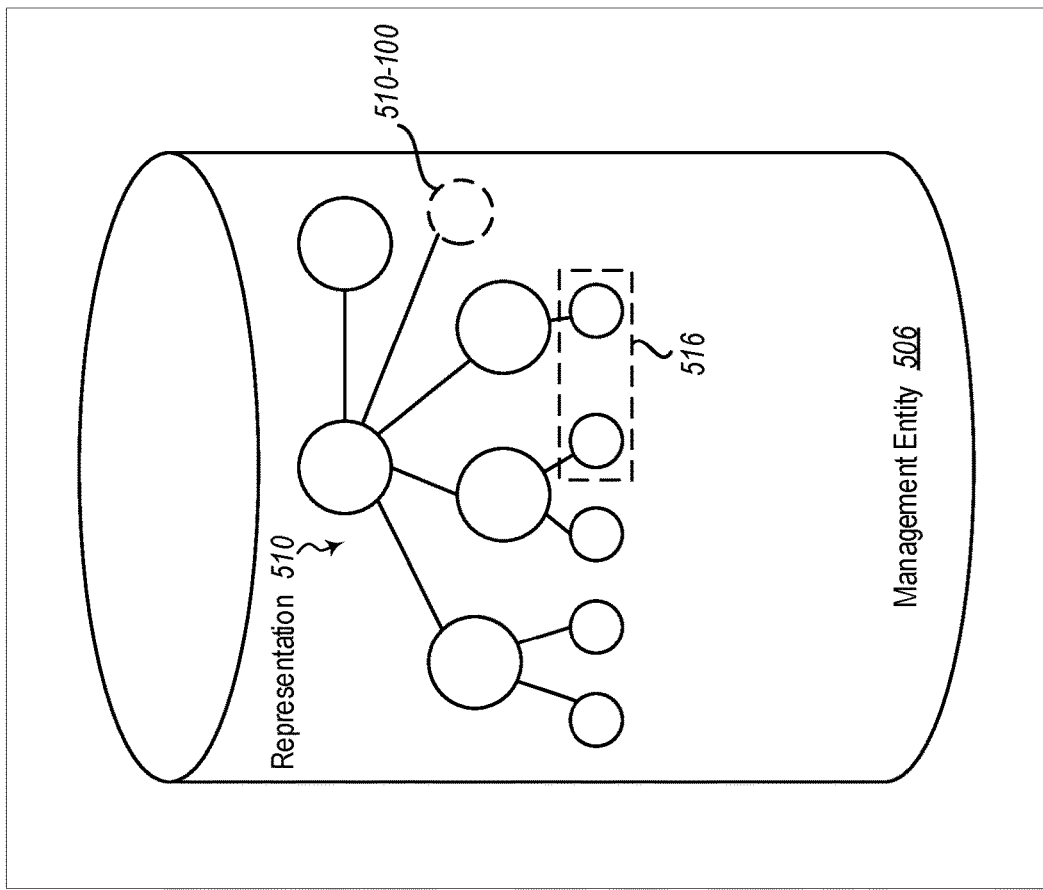

Attention is now directed to FIG. 5. FIG. 5 illustrates a device network 102 implemented in a location 104. Note that while a building is illustrated for the location 104, it should be appreciated that the location 104 could be any one of a number of different entities. For example, the location 104 may be an entire company. Alternatively or additionally, the location 104 may be a division of a company. Alternatively or additionally, the location 104 may be a city or town where the company has a presence. Alternatively or additionally, the location 104 may be a building. Alternatively or additionally, the location 104 may be a floor of a building. Alternatively or additionally, the location 104 may be a workspace on the floor of a building. And so forth.

The device network 102 includes a number of devices. The devices may be any one of a number of different devices that may be implemented in an IoT network. For purposes of the particular example, it will be assumed that the devices are implemented in a building control network and thus are relevant to that particular application. For example, in the example illustrated herein, the devices may be temperature controllers, HVAC controllers, lighting controllers, motor controllers, room scheduling equipment, and so forth.

FIG. 5 further illustrates a management entity 506. The management entity 506 includes a data store 508. The data store 508 includes a representation 510 of the device network 502. While the representation 510 illustrated in FIG. 5 is a graph, the representation 510 can be represented in a number of different forms such as spreadsheets, flat files, or other representations.

The management entity further includes computing hardware and executable instructions configured to perform certain tasks as illustrated below. The management entity may further include connection hardware, such as network devices, to allow the management entity 506 to connect to various devices in the device network 502.

The representation 510 documents the devices in the device network 502. Note however, that the representation 510 may include information, or may exclude information, that makes the representation 510 inaccurate with respect to the actual device network 502. For example, in the example illustrated in FIG. 5, the representation 510 includes a representation of a device 510-100 that is not included in the actual device network 502. Thus, the representation 510 includes information that is not reflective of the device network 502.

The representation 510 may exclude certain information which makes it inaccurate as well. For example, the device network 502 includes a set of devices 512 which are not represented in the representation 510. Thus, the representation 510 is inaccurate due to not including portions of information reflective of the actual device network 502.

The representation 510 may have information that is incorrect for particular devices. For example, FIG. 5 illustrates a set of devices 514 which are configured differently than what is included in the representation 510 as illustrated at 516. That is, the device network 502 may include mismatched configuration devices.

Embodiments illustrated herein include functionality for allowing the management entity 506 to accurately reflect the state of the device network 502. This can be done by probing the various devices on the device network 502 and using data analysis to attempt to identify the various devices on the device network 502, as well as the configuration of the various devices on the device network 502.

Figure 6:
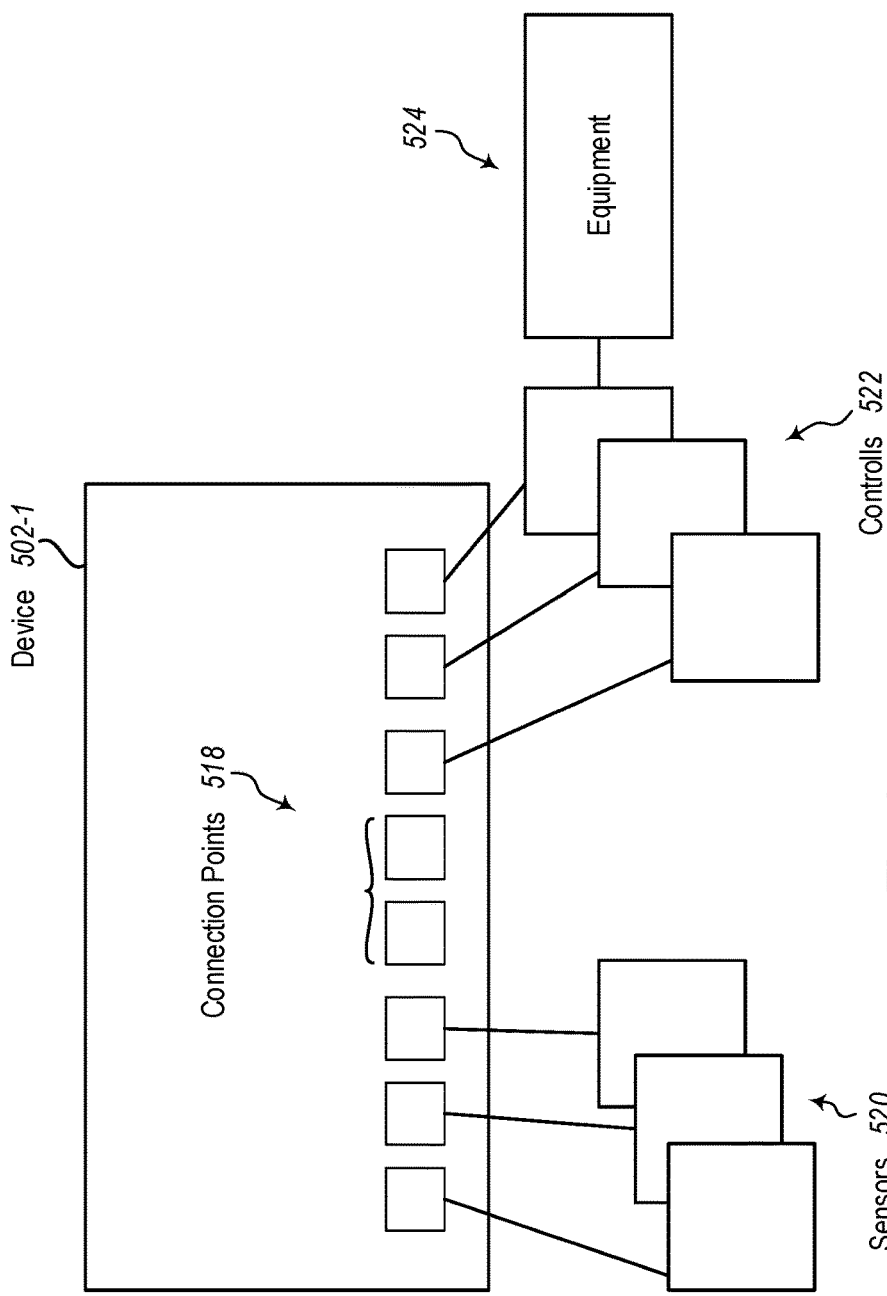
FIG. 6 illustrates a device coupled to sensors, controllers, and equipment.
Figure 6:
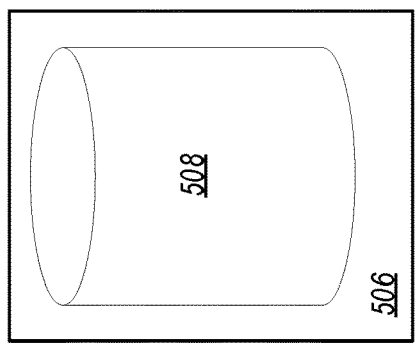

An example is now illustrated in FIG. 6. FIG. 6 illustrates a management entity 506 including a data store 508, with the representation 510, coupled to a particular device 502-1. Note that the example shown in FIG. 6 shows the probing of a particular device and it should be appreciated that the management entity 506 is coupled to the entire device network 502 allowing the management entity 5062 probe all of the devices on the device network 502. However, for purposes of illustrating discovery of an individual device, as well as the configuration of the individual device, FIG. 6 illustrates an example where the management entity 506 is connected to only a single device 502-1.

The following now illustrates how the management entity 506 attempts to discover the configuration of the device 502-1. Note that the device 502-1 includes a set of connection points 518. For example, the device 502-1 may be a programmable logic controller having various connection points for connection to sensors and/or controls. FIG. 6 illustrates that a portion of the connection points 518 are connected to a set of sensors 520.

The sensors 520 may be any one of a number of different sensors, such as temperature sensors, airflow sensors, $CO_2$ sensors, lighting sensors, room occupancy sensors or even more virtual type of sensors such as room scheduling data sources, etc. The sensors typically provide raw data values back to the device 502-1. These raw data values can be provided to the management entity 506 or may be transformed into different data for use by the management entity 506. What the raw data values represent may not be immediately obvious. For example, a temperature sensor will often output a voltage. That voltage typically corresponds with some temperature, but without knowing the correlation between voltages and temperatures, one would not be immediately able to determine the temperature represented by the voltage. However, assumptions can often be made based on raw data values. For example, temperature sensors often have a typical range of voltages used to represent temperatures. Other sensors may have a typical range of voltages, currents, binary values, and the like to output raw data that represents some real-world condition. The management entity 506 can then make certain assumptions about the device 502-1 and connected sensors 520 based on the values identified by probing connection points connected to sensors 520. Note that in some embodiments, the device 502-1 will have compute functionality that is able to convert raw data to real-world values, such as temperature values, airflow values, or other values, that can be provided to the management entity 506.

Once the management entity 506 has identified a set of devices device types to which the device 502 502-1 could belong, the management entity 506 can perform additional functionality to attempt to narrow the range of possible devices which the device 502-1 could be. For example, as illustrated in FIG. 6, the device 502-1 is connected to a set of controls 522. The controls 522 may be connected to equipment 524. The equipment may be for example lighting controllers, heaters, blowers, motors, alarms, communication equipment, screens, indicator lights, etc. If a device has a certain type of types of sensor, it can be expected that the device has corresponding types of controls connected to corresponding types of equipment. Thus, for example, if the device 502-1 has a temperature sensor, and an assumption is made that the device 502-1 is a temperature controller, an assumption can be made that the device 502-1 further includes a heater in the equipment 524 and a control for the heater in the controls 522. Thus, the management entity 506 can send a command to the device 502-1 to attempt to actuate the heater using a control at the device 502-1. If a heater is activated, the management entity can now safely assume the configuration of the device 502-1. This allows the management entity 506 to add the device 502-1 to the representation 510 and/or to update the represented configuration of the device 502-1 in the representation 510.

The following now illustrates a specific example of the functionality described herein. Note that in the example illustrated below BACnet is illustrated as the example protocol. However, it should be appreciated that any appropriate building automation protocol, like BACnet, Modbus, LonTalk, KNX, BLE, etc. could be used.

Some embodiments may implement BACnet discovery inside a management entity which is able to probe the BACnet network and find devices and their configuration. Initially the only configuration needed to go fetch devices is BACnet/IP Broadcast Management Device, MAC and subnet information, and IP Port.

Embodiments may further include a representation of a graph topology which defines the physical location hierarchy of BACnet devices in regions, countries, campuses, venues, floors, areas, etc.

Embodiments can filter BACnet devices based on configuration templates which allows a good match with graph topology so raw BACnet data is mapped and tagged to a physical location. In the illustrated example, the mapping templates will have a certain json data model which has Device Id Range, Device Class, needed Tags that need to be filtered, their object types and instances ids, physical location nodes of type: Region, Country, Campus, Venue, etc. The match of raw data with physical location hierarchy objects happens based on exploring BACnet object model properties (like Tag Description or location field) and finding patterns to match. Matching is done also based on predictions or suggestions based on previous results findings, for example, by using machine learning.

Beyond the initial discovery/mapping process, embodiments also handle the case where devices announce themselves after installation (e.g., when a bad device is replaced, the device sometimes has the capability to announce "I_AM" proactively, rather than reactive to a "Who_Is" requests). After announcing, embodiments dynamically handle that announcement and map its physical location.

Some embodiments may include visualizations, such as via a management application and/or via augmented/virtual reality, to improve the quality of data via tools designed to highlight potential mismatches (e.g., variable air volume (VAV) devices mapped to locations w/o any duct work).

In the illustrated example using BACnet, the protocol services Who-Is, I-Am, Who-Has, I-Have, are used for device and object discovery. Services such as Read-Property and Write-Property are used to obtain sensor data and provide control information, respectively.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
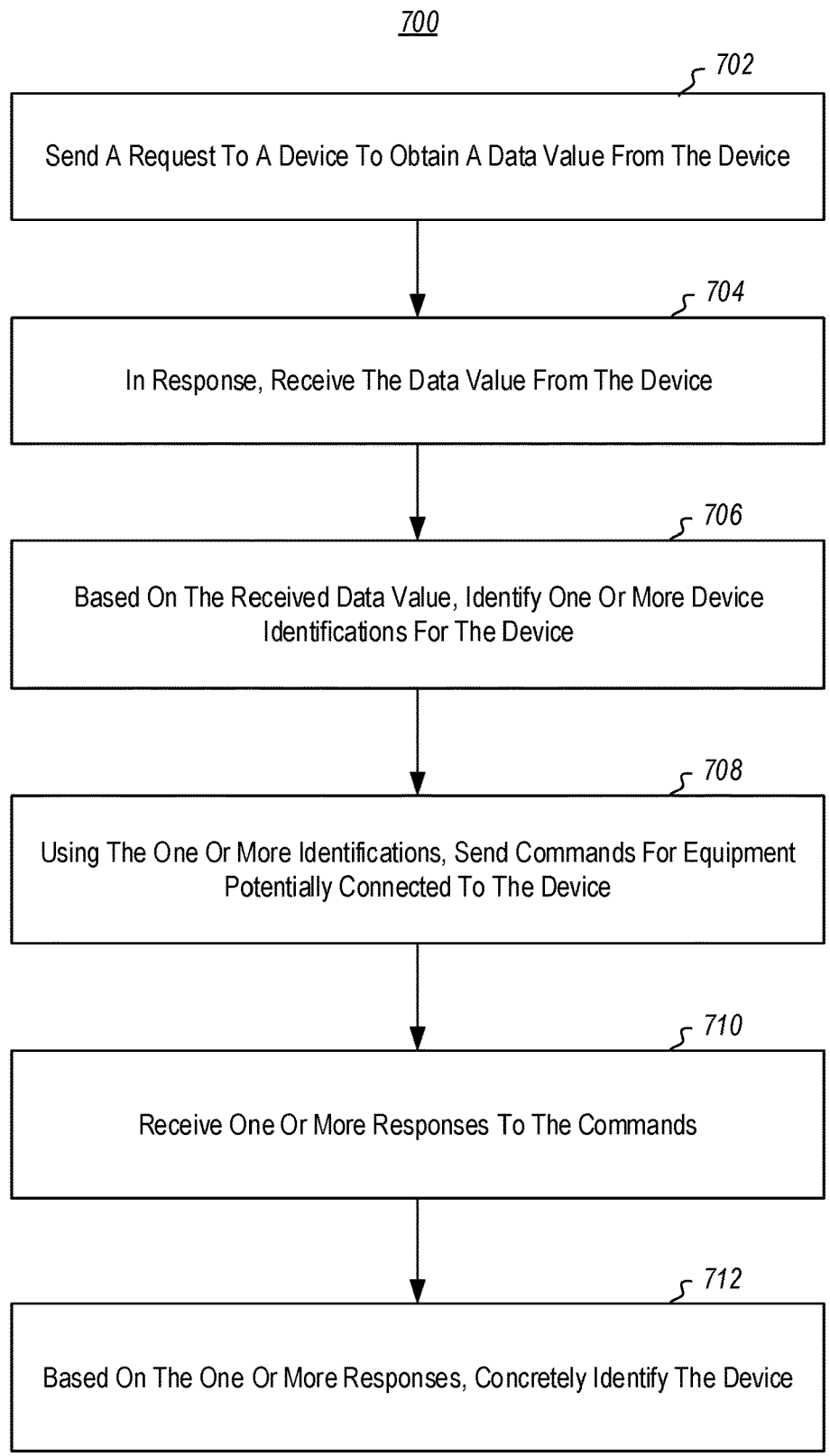
FIG. 7 illustrates a method of discovering devices and device configurations.

Referring now to FIG. 7, a method 700 is illustrated. The method 700 may be practiced in a device control environment. The method includes acts for discovering devices and device configurations. The method 700 includes sending a request to a device to obtain a data value from the device (act 702). For example, the management entity 506 may send a message to the device 502-1 attempting to obtain data values from one or more of the connection points 518.

The method 700 further includes, in response, receiving the data value from the device (act 704). For example, the device 502-1 may send data taken from the connection points (either raw or transformed) to the management entity 506.

The method 700 further includes, based on the received data value, identifying one or more device identifications for the device (act 706). For example, the management entity 506 may be configured to identify specific device types and/or configurations to which the device 502-1 may belong.

The method 700 further includes, using the one or more identifications, sending commands for equipment potentially connected to the device (act 708). For example, the management entity 506 may send commands to the device 502-1 intended for the controls 522 connected to one or more of the connection points 518 to attempt to control equipment 524 that is believed to be at the device 502-1 based on the initial identification of types and/or configurations. For example, if the management entity 506 believes that the device 502-1 is a heating control device based on receiving a temperature, then the management entity may attempt to send a command to the device 502-1 attempting to actuate a heater or air conditioning unit.

The method 700 further includes, receiving one or more responses to the commands (act 710). For example, the management entity 506 may receive information indicating that the commands to control equipment 524 at the device 502-1 were successful, or that the commands were not successful. For example, the management entity 506 may be able to identify that actuation of a heater resulted in the temperature raising in an environment.

The method 700 further includes, based on the one or more responses, concretely identifying the device (act 712). For example, if the temperature is able to be controlled using the device 502-1, management entity 506 can concretely determine that the device 502-1 is indeed a temperature controller. The device 502-1 can then be accurately represented in the representation 510 of the data store 508 as a temperature controller.

The method 700 may be practiced where concretely identifying the device comprises identifying a type of device. For example, the device may be identified by manufacture and model number, as a temperature control device, as a VAV device, as an HVAC device, or other appropriate type of device.

The method 700 may be practiced where concretely identifying the device comprises identifying a configuration of the device. For example, embodiments may be able to identify specific configurations of specific devices. For example, embodiments may be able to identify that a particular type of VAV device has been configured to perform certain functionality.

The method 700 may be practiced where the received data value comprises a voltage value. For example, embodiments may be implemented where the management entity 506 requests a raw data value from the device 502-1. The raw data value may be a voltage representing a temperature, rheostat value, $CO_2$ level, or other real-world value. Similarly, in alternative embodiments, the data value may comprise an amperage value, resistance value, or some other analog type value.

Note that in some embodiments, the device 502-1 may include compute functionality which processes raw data values to produce other values. For example, the device 502-1 may convert a voltage value to a number representing a temperature. In some such cases where such computer has been implemented on the device 502-1, the device may send an actual temperature value to the management entity 506. In these cases, the management entity 506 can more accurately initially identify possible devices by using the real-world value rather than trying to deduce the meaning of a raw data value.

The method 700 may be practiced where receiving one or more responses to the commands comprises receiving a response identifying an environmental response to activation or deactivation of equipment. For example, rather than receiving a direct message back from the device 502-1 indicating that a control has been executed actuated and/or that equipment has been actuated, some embodiments may monitor environmental conditions. For example, actuation of the control actuating a heater may cause a separate temperature sensor to change values thus allowing the management entity 506, which is able to monitor the temperature through the separate temperature sensor, to identify that the controller is able to control temperature.

The method 700 may further include identifying a set of data outputs on the device; and identifying outputs on the device that are not connected to sensors or controls. For example, FIG. 6 illustrates an example where certain connection points are not connected to any sensors 520 or controls 522. Embodiments may be configured to identify that no sensors or controls are connected to these connection points. This can be accomplished by identifying noise on the connection points and/or a data value of zero on the connection points. These connection points can be filtered out when attempting to query, or send commands to, various connection points on the device 502-1.

The method 700 may be practiced where identifying one or more device identifications for the device comprises identifying devices from a set of devices that should be installed in the device control environment. For example, the management entity 506 may have pre-existing knowledge of the types of devices that should exist on the device network 502. This may be based on construction plans for a location 504, or using other information about devices that are likely installed in the location 504. This set of known devices can be used to attempt to identify specifics about a particular device, such as device 502-1.

The method 700 may be practiced where identifying one or more device identifications for the device comprises identifying devices from a set of devices that are installed elsewhere in the device control environment, or a similar device control environment. For example, consider a case where a plurality of different buildings are constructed based on a predetermined plan where each of the buildings is essentially a carbon copy of the other buildings. Building designs, including control equipment specified in the building designs, should be the same from building to building. Thus, in some embodiments, the management entity 506 can use information known about devices installed in similar buildings as a starting point for identifying potential devices installed in a particular location 504.

The method 700 may be practiced where concretely identifying the device comprises identifying that the device is broken, misconfigured or an incorrect device for a location where the device is installed. For example, consider the case described above where multiple different buildings are designed using the same design. If a device discovery process does not discover a particular device type and/or configuration that is expected based on previous installations, the management entity 506 may determine that the device is misconfigured, defective, or an incorrect device for the particular location in which it is installed.

The method 700 may be practiced where concretely identifying the device comprises identifying that the device is a rogue device. For example, a nefarious entity may introduce a device to the device network 502 where the nefarious device is intended to perform some nefarious activity, such as unauthorized data collection, industrial espionage, business disruption, or some other unwanted activity. By probing the device network 502, the management entity 506 can identify such devices and work to remove such devices from the device network 502.

The method 700 may be practiced where concretely identifying the device comprises identifying the device with a particular confidence score for an identification of the device. For example, the management entity 506 may not be able to identify that a particular device 502-1 is of a particular type and/or configuration with 100% accuracy. However, the device 502-1 can identify with some confidence level, typically expressed as a percentage, that the device is the identified type and/or configuration.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to discover devices and device configurations, including instructions executable to implement a computer process comprising:
   sending a request to a device to obtain a sensor measurement from the device;
   in response, receiving the sensor measurement from the device;
   based on a value of the received sensor measurement, identifying a subset of one or more potential device types for the device;
   using the one or more potential device types, identifying equipment potentially connected to the device and sending commands for controlling the equipment potentially connected to the device;
   receiving one or more responses to the commands, and
   based on the one or more responses, confirming that the device is one of the potential device types included in the identified subset.

2. The computer system of claim 1, wherein confirming that the device is one of the device types further comprises: identifying a configuration of the device.

3. The computer system of claim 1, wherein the received sensor measurement comprises a voltage value.

4. The computer system of claim 1, wherein the received sensor measurement comprises an amperage value.

5. The computer system of claim 1, wherein receiving one or more responses to the commands comprises receiving a response identifying an environmental response to activation or deactivation of equipment.

6. The computer system of claim 1, wherein the computer process further comprises:
   identifying a set of data outputs on the device; and
   identifying outputs on the device that are not connected to sensors or controls.

7. The computer system of claim 1, wherein identifying the one or more potential device types for the device comprises identifying devices from a set of devices that should be installed in the device control environment.

8. The computer system of claim 1, wherein the one or more potential device types comprises identifying devices from a set of devices that are installed elsewhere in the device control environment, or a similar device control environment.

9. The computer system of claim 1, wherein the computer process further comprises: identifying that the device is broken, misconfigured or an incorrect device for a location where the device is installed.

10. The computer system of claim 1, wherein confirming that the device is one of the device types further comprises: identifying that the device is a rogue device.

11. The computer system of claim 1, wherein confirming that the device is one of the device types further comprises: identifying the device with a particular confidence score for an identification of the device.

12. In a device control environment, a method of discovering devices and device configurations, the method comprising:
   sending a request to a device to obtain a sensor measurement from the device;
   in response, receiving the sensor measurement from the device;
   based on a value of the received sensor measurement, identifying a subset of one or more potential device types for the device;
   using the one or more potential device types, identifying equipment potentially connected to the device and sending commands for controlling the equipment potentially connected to the device;
   receiving one or more responses to the commands, and
   based on the one or more responses, confirming that the device is one of the potential device types included in the identified subset.

13. The method of claim 12, wherein confirming that the device is one of the potential device types comprises identifying a configuration of the device.

14. The method of claim 12 further comprising:
   identifying a set of data outputs on the device; and
   identifying outputs on the device that are not connected to sensors or controls.

15. The method of claim 12, wherein identifying a subset of one or more potential device types for the device comprises identifying devices from a set of devices that are installed elsewhere in the device control environment, or a similar device control environment.

16. The method of claim 12, wherein the method further comprises: identifying that the device is broken, misconfigured or an incorrect device for a location where the device is installed.

17. The method of claim 12, wherein the method further comprises: identifying that the device is a rogue device.

18. A device network, wherein the device network comprises:
- a plurality of devices;
- a management entity coupled to each of the devices in the plurality of devices, wherein management entity is configured to perform the following:
- send a request to a device to obtain a sensor output from the device;
- in response, receive the sensor output from the device;
- based on a value of the received sensor output, identify a subset of one or more potential device types for the device;
- using the one or more potential device types, identify equipment potentially connected to the device and send commands for controlling the equipment potentially connected to the device;
- receive one or more responses to the commands, and
- based on the one or more responses, confirming that the device is one of the device types included in the identified subset of potential device types.

19. The method of claim 12, further comprising:
- identifying one or more types of sensors capable of outputting the value of the sensor measurement; and
- identifying one or more types of devices that potentially include the one or more types of sensors capable of outputting the value.

20. The device network of claim 18, wherein the management entity identifies the subset of one or more potential device types by:
- identifying one or more types of sensors capable of outputting the value of the sensor output; and
- identifying one or more types of devices that potentially include the one or more types of sensors capable of outputting the value.

* * * * *